United States Patent Office 2,838,387
Patented June 10, 1958

2,838,387
IMPROVED FUEL COMPOSITIONS

Harry W. Rudel, Roselle, N. J., assignor to Esso Research and Engineering Company, a corporation of Delaware No Drawing. Application January 20, 1954
Serial No. 405,259

4 Claims. (Cl. 44—79)

The present invention concerns improved fuel compositions for use in internal combustion engines which result in a reduction in the formation of the amount of combustion chamber deposits within the engine. The invention more specifically relates to gasoline fuels which contain small amounts of fluorine compounds selected from the class consisting of fluorinated hydrocarbons and halo hydrocarbons adapted to form protective films upon the inner surfaces of the combustion chambers in which the fuels are burned.

A problem of increasing importance in the field of internal combustion engines and internal combustion engine fuels concerns the formation of deposits within the combustion chambers of such engines. The problem is particularly urgent in automotive engines and reciprocating type aircraft engines which operate on gasoline-type fuels. The primary problem which results from the presence of these deposits is the fact that they cause the engine in which they occur to experience a very substantial increase in its octane number requirement. Thus, it has been found that an automotive engine operating on a conventional gasoline fuel, either leaded or unleaded, will experience an octane requirement increase of as much as 10 to 20 octane numbers in an operating period of 10,000 to 20,000 miles. It has further been found that this octane requirement increase is directly related to the amount and type of deposits that are formed and left within the combustion chambers of an engine.

At this point it would be well to point out that the term "octane number requirement" as it relates to an engine is the octane rating of the fuel that must be employed within the engine to prevent the occurrence of knock when the engine is operated. The term "octane number requirement increase, abbreviated to ORI," refers to the increase in octane requirement that an engine may experience during a part or all of its operating life.

It is common knowledge in the art that different automotive and aviation engines may possess different octane number requirements and octane number requirement increases. The octane requirement and/or ORI of any given engine will be governed largely by two factors: (1) the mechanical design of the engine, and (2) the amount and type of deposits that exist within the combustion chambers of the engine.

The first of these factors embraces such items as the compression ratio of the engine, the exhaust back pressure, placement of the valves, etc. It is apparent that these items are controlled almost entirely by the structure of the engine itself. It will be noted that the designers and manufacturers of automotive engines are contemplating engines of increasingly higher compression ratios in the near future, since the higher the compression ratio of a particular engine, the greater the specific fuel economy of such an engine.

The second factor, namely combustion chamber deposits, is influenced to a great extent by the fuels that are employed in automotive and aviation engines. The contemplated increase in the compression ratios of these engines, which in itself will require fuels of improved anti-knock quality, is aggravated by this second factor.

Combustion chamber deposits in spark ignition engines tend to increase the octane number requirements of such engines for several reasons. For example, the physical volume taken up by these deposits reduces the volume of each combustion chamber with the result that the compression ratio increases. Further, these deposits appear to promote knocking by acting as a heat insulator. It has also been postulated that these deposits become incandescent at the temperatures that exist within a combustion chamber and that they actually preignite the fuel and air mixture therein. In this connection, it will be noted that engine knock is a phenomenon associated with the ignition of an unburned mixture of fuel and air ahead of the normal flame front. Preignition on the other hand is a spontaneous premature ignition of the fuel and air charge occurring before the spark. But whether it be knocking or preignition, it is considered that combustion chamber deposits play a major role in the occurrence of either condition.

The petroleum industry is resorting to a number of methods for approaching the problem of meeting the ever-increasing demand for fuels that have higher and higher octane ratings. For example, they are now employing such processes as catalytic cracking, alkylation, hydroforming, polymerization, etc., to produce fuel constituents which have high anti-knock ratings. In addition, refineries are continuing to employ fuel additives such as alkyl lead compounds in gasolines, since these compounds greatly increase the anti-knock quality of the fuels in which they are incorporated.

While alkyl lead compounds are effective in increasing the octane number of a gasoline, these compounds in themselves tend to aggravate the octane requirement increase problem. Thus, lead reacts within the combustion chambers of a spark ignition internal combustion engine to form compounds such as lead oxides, lead oxy halides, lead oxy sulfates, etc., which tend to deposit upon and adhere to the inner surfaces of the combustion chambers. The physical volume of these deposits tends to increase the octane requirement of an engine; and in some instances the compounds appear to act catalytically or otherwise to increase even further the octane requirement of the engine. Scavenging agents, such as ethylene dibromide, ethylene dichloride, tricresyl phosphate, and the like have been added to leaded gasolines in an effort to scavenge the lead deposits from the combustion chambers of an engine; but these compounds are at best only partially successful in this respect.

Accordingly, it is an object of the present invention to provide an improved method of operating an internal combustion engine whereby the engine experiences a reduced amount of combustion chamber deposits and a reduced octane number requirement increase. It is a further object of the present invention to provide improved fuel compositions, for use in internal combustion engines, that, upon use in such engines, result in decreased amounts of combustion chamber deposits and in decreased octane number requirement increases.

These objectives are realized in accordance with the present invention by maintaining a film of a substantially non-volatile, thermally stable, non-inflammable, gasoline-solube liquid on the interior wall surfaces of each combustion chamber. In accordance with one embodiment of the present invention, a suitable material for achieving this objective may be introduced directly within each combustion chamber of an engine. In accordance with a second embodiment of the present invention a material suitable for this purpose may be incorporated within the fuel upon which the engine is operated.

Compounds which are suitable for the purposes of the present invention consist broadly of alkanes, arylalkanes, and halogenated alkanes and aryl alkanes which are at least partially fluorinated. The compounds must have a melting point not greater than 100° C. and preferably not greater than 50° C. The compounds also must be liquid at the temperatures which prevail on the interior surfaces of the combustion chambers of internal combustion engines and which are conducive to deposit formation. In this connection, the engines particularly contemplated in connection with the present invention are spark ignition engines and particularly automotive engines. The surface temperatures of the combustion chambers of such engines which are considered to be particularly conducive to the formation of combustion chamber deposits are of the order of about 400° to 500° F. The present invention accordingly is especially concerned with surface temperatures of this order of magnitude.

The compounds of the present invention must have a boiling point of not less than 100° C. at 1 mm. Hg and preferably greater than about 150° C. at 1 mm. Hg. Furthermore, the compounds must be non-inflammable in an oxidizing atmosphere of the type that exists within the combustion chambers of an internal combustion engine. It is preferred that the compounds do not decompose below their vaporization temperature, or below a temperature of about 550° F.

The compounds for use in the present invention must contain at least 14 carbon atoms and preferably at least about 22 carbon atoms. Broadly speaking, the compounds preferred are fluoro derivatives of alkanes and aryl alkanes and of alkanes and arylalkanes that contain other halogen atoms. When other halogens are present, it is preferred that the compounds contain at least one fluorine atom for each other halogen atom in the compounds; and it is especially preferred that the compounds contain at least three fluorine atoms for each other halogen atom present in the compounds. The other halogens which may be employed include chlorine and bromine. Chlorine and bromine are particularly preferred; and chlorine is especially preferred for the purposes of the present invention.

Specific examples of the compounds that may be employed in the practice of the present invention include compounds and compositions that are formed by the fluorination of petroleum fractions that boil in the kerosene boiling range and higher. Fluorinated petroleum fractions boiling in the gas-oil boiling range and higher are particularly preferred. It will be noted that the petroleum fractions may also be halogenated with other halogens as described earlier herein. Compounds and compositions of this type may be prepared in general by the following technique. The petroleum fraction is vaporized, diluted with an inert gas and passed through a bed of cobalt trifluoride at 275–300° C. Cobalt trifluoride is regenerated by fluorination of the cobalt difluoride end product.

Reactions of this type are described in more detail in Industrial and Engineering Chemistry, vol. 39, No. 3, pages 343 to 345, 350 to 352, and 352 to 354 (1947).

Other compounds that may be employed in the practice of the present invention include alkanes, arylalkanes and halogenated alkanes and aryl alkanes all of which are at least partially fluorinated and that are formed by (1) the polymerization and saturation of low molecular weight fluorine-containing alkenes, arylalkenes, halo alkenes and haloaryl alkenes; (2) the fluorination of high molecular weight hydrocarbons and halo hydrocarbons. Particularly preferred are the polymers of the lower molecular weight compounds named first.

Specific examples of compounds that may be polymerized and then saturated as by fluorination to form the compounds and compositions of the present invention include trifluoromonochloroethylene, tetrafluoroethylene, 1-chloro, 3-bromo phenyl trifluoroethylene, 2-2 difluoro, 1-1 dichloroethylene, hexafluoropropylene, octafluorobutene, etc.

A particularly preferred class of compounds for use in connection with the present invention consists of compounds and mixtures of compounds that are formed by the polymerization and subsequent saturation by fluorination of trifluoro monochloroethylene. These compounds may be generically defined as polytrifluorovinyl chloride. Such polymers are well known in the art and are generally prepared by the following procedure.

Trichlorotrifluoroethane is treated with alcohol and zinc to form trifluorovinyl chloride. This in turn is polymerized in a chloroform solution with a peroxide catalyst. The terminal unsaturation is fluorinated with cobalt trifluoride by the previously described technique.

The preparation of these compounds is dealt with in detail in Industrial and Engineering Chemistry, vol. 39, No. 3 (1947), pages 333–337, and pages 338–342.

An especially preferred polymer of perfluorovinyl chloride is characterized by possessing a molecular weight of about 1200 and a boiling point up to about 210° C. at 1 mm. Hg.

The fluorinated compounds described above may be injected directly within the combustion chambers of an internal combustion engine in an amount sufficient to provide a liquid film on the inner surfaces of the chambers. Thus, these compounds may be injected entirely separate from the fuel or air charge to each combustion chamber. The compounds may also be injected as by atomization or spraying into the intake manifold of the engine.

The amount of compound to be introduced within the combustion chambers of an engine is best contemplated to constitute from about 0.001 to 2 wt. percent of the fuel charge to the engine. It is particularly preferred that from about 0.01 to 1 wt. percent of a fluorinated compound, based on the fuel charge, be employed.

The best mode contemplated for carrying out the present invention consists in employing a gasoline fuel composition that contains from about 0.001 to 2 wt. percent and especially from about 0.01 to 1 wt. percent of a fluorinated compound within an engine. The gasoline fuel component of this composition may be prepared from any of the stocks that are conventionally employed as fuels or fuel components for internal combustion engines, including automotive engines and aircraft engines. Thus, the gasoline fuel of the fuel composition may contain virgin, thermally cracked, catalytically cracked, polymerized or alkylated hydrocarbons and mixtures thereof that boil within the gasoline boiling range. In general, any gasoline-type fuel may be improved by the practice of the present invention.

The best fluorine compound contemplated for use in conjunction with the gasoline component of the present invention is a polymer of trifluoromonochloroethylene which has been saturated by additional fluorination. The polymer has a molecular weight of about 1200 and is preferably dissolved in the gasoline to constitute about 0.6 to 0.7 wt. percent of the fuel composition.

Anti-knock agents such as lead alkyls are employed in conventional amounts as well as other fuel additives such as scavenging agents, solvent oils, gum flux agents, dyes, gum inhibitors, lead stabilizers, carburetor anti-icing agents, etc.

The following example will serve better to illustrate and explain the nature and scope of the present invention. In this example a fuel composition was employed to run a single cylinder, spark ignition, Lauson internal combustion engine. The fuel employed was a conventional motor gasoline which consisted of a blend of $C_4$ hydrocarbons and straight run, thermally cracked and catalytically cracked naphthas. The gasoline had a boiling range of about 101 to 404° F., and contained 1.3 cc. of lead tetraethyl per gallon. It also contained conventional amounts of ethylene dibromide and ethylene dichloride as a scavenging agent for the lead. The sulfur content of the fuel was 0.08% by weight of the fuel. The lubricant employed in the engine tests was of the conventional polypropylene oxide type.

The engine was first run on the conventional fuel described above for a period of 190 hours at which time the octane requirement of the engine had increased from 53.5 to an equilibrium value of 69.5. The engine was dismantled at this point and the weight of combustion chamber deposits present within the engine determined. The deposits were carefully removed from the spark plug, exhaust valve, and other interior surfaces of the combustion chamber and weighed. The amount of deposits from this test was found to be a total of 10.1 grams.

The engine was then reassembled and again operated for a period of 190 hours on the same hydrocarbon fuel and lubricant. In the second test, however, the fuel contained 0.67 wt. percent of a polymer of trifluoromonochloroethylene fluorinated to remove any unsaturation. This particular polymer had a molecular weight of about 1200 and boiled at a temperature of the order of about 210° C. at 1 mm. Hg. Following this test it was found that the engine had an equilibrium octane number requirement of 65 and contained only 7.8 grams of deposits within its combustion chamber. These results show the great effectiveness of the present fuel compositions in both preventing the formation of combustion chamber deposits within an internal combustion engine and for reducing the degree of increase in octane requirement that such an engine would otherwise experience.

What is claimed is:
1. A fuel composition for use in internal combustion engines comprising a gasoline to which has been added about 0.001 to 2 wt. percent of a fluorine-saturated polymer of a compound selected from the group consisting of trifluoromonochloroethylene, tetrafluoroethylene, 1-chloro 3-bromo phenyl trifluoroethylene, 2-2 difluoro 1-1 dichloroethylene, hexafluoropropylene, and octafluorobutene, said polymer having a boiling point above 100° C. at 1 mm. Hg and a melting point not higher than 100° C.

2. A composition as defined in claim 1 wherein said fluorine-saturated polymer boils above about 150° C. at 1 mm. Hg.

3. A composition as defined in claim 2 wherein said fluorine-saturated polymer is a fluorine-saturated polytrifluoromonochloroethylene having a molecular weight of about 1200.

4. A composition as defined in claim 3 wherein said fluorine-saturated polymer is present in a concentration of from 0.6 to 0.7 wt. percent.

References Cited in the file of this patent
UNITED STATES PATENTS

| 2,281,598 | Prutton et al. | May 5, 1942 |
| 2,327,708 | Herbst | Aug. 24, 1943 |